(12) United States Patent
Bentley

(10) Patent No.: US 8,922,892 B2
(45) Date of Patent: Dec. 30, 2014

(54) METHOD OF PRODUCING A DIFFRACTIVE OPTIC ELEMENT AND THE RESULTING ELEMENT

(75) Inventor: Philip Gareth Bentley, Cambridgeshire (GB)

(73) Assignee: Conductive Inkjet Technology Limited, Yorkshire (GB)

( * ) Notice: Subject to any disclaimer, the term of this patent is extended or adjusted under 35 U.S.C. 154(b) by 702 days.

(21) Appl. No.: 13/201,377

(22) PCT Filed: Feb. 11, 2010

(86) PCT No.: PCT/GB2010/050222
§ 371 (c)(1),
(2), (4) Date: Aug. 19, 2011

(87) PCT Pub. No.: WO2010/092392
PCT Pub. Date: Aug. 19, 2010

(65) Prior Publication Data
US 2011/0292511 A1 Dec. 1, 2011

(30) Foreign Application Priority Data
Feb. 13, 2009 (GB) .................................. 0902398.7

(51) Int. Cl.
| | | |
|---|---|---|
| *G02B 5/18* | (2006.01) | |
| *G03H 1/02* | (2006.01) | |
| *B42D 15/00* | (2006.01) | |
| *G03H 1/18* | (2006.01) | |

(52) U.S. Cl.
CPC ............ *G02B 5/1847* (2013.01); *G03H 1/0252* (2013.01); *B42D 15/0013* (2013.01); *B42D 2033/10* (2013.01); *B42D 2035/22* (2013.01); *G03H 1/0244* (2013.01); *G03H 2001/0284* (2013.01); *G03H 2001/185* (2013.01); *G03H 2001/187* (2013.01); *G03H 2250/10* (2013.01); *G03H 2250/36* (2013.01); *G03H 2250/40* (2013.01); *Y10S 359/90* (2013.01)
USPC .............................. 359/566; 359/900; 264/1.1

(58) Field of Classification Search
None
See application file for complete search history.

(56) References Cited

U.S. PATENT DOCUMENTS

| | | | |
|---|---|---|---|
| 5,629,068 A | 5/1997 | Miekka et al. ................. | 428/148 |
| 2003/0223616 A1 | 12/2003 | D'Amato et al. .............. | 382/100 |

(Continued)

FOREIGN PATENT DOCUMENTS

| | | | | |
|---|---|---|---|---|
| WO | WO 91/14975 | 10/1991 | ............... | G03H 1/02 |
| WO | WO 2005/056875 | 6/2005 | ............... | C23C 18/16 |
| WO | WO 2008/004203 | 1/2008 | ............... | G03H 1/02 |

OTHER PUBLICATIONS

International Search Report mailed Apr. 21, 2010, in PCT Application No. PCT/GB2010/050222.

(Continued)

*Primary Examiner* — Arnel C Lavarias
(74) *Attorney, Agent, or Firm* — Morgan, Lewis & Bockius LLP

(57) ABSTRACT

A method of producing a diffractive optical element includes forming on a textured surface of a first substrate (2) a predetermined pattern of an ink (3) including an activator for a metallization reaction and one or more binders; causing or allowing the binder to solidify; applying a first adhesive layer (4) on top on the solidified binder and activator; securing a second substrate (5) to the adhesive layer; removing the second substrate with adhered solidified binder and activator from the first substrate; and forming a metal coating (10) onto the activator-containing regions adhered to the second substrate.

15 Claims, 1 Drawing Sheet

(56) References Cited

U.S. PATENT DOCUMENTS

2005/0082699 A1* 4/2005 Dixon .......................... 264/1.34
2006/0035066 A1   2/2006 Souparis et al. ........... 428/195.1
2006/0114530 A1   6/2006 Morwald et al. ................. 359/2

OTHER PUBLICATIONS

Great Britain Search Report dated Mar. 15, 2009 in GB Application No. GB0902398.7.

* cited by examiner

METHOD OF PRODUCING A DIFFRACTIVE OPTIC ELEMENT AND THE RESULTING ELEMENT

This application is a 371 filing based on PCT/GB2010/050222, filed Feb. 11, 2010, which claims priority to United Kingdom Application No. 0902398.7, filed Feb. 13, 2009, all of which are hereby incorporated by reference in their entirety.

FIELD OF THE INVENTION

This invention relates to diffractive optical elements and concerns a method of producing a diffractive optical element and the resulting element. The diffractive optical elements may be in the form of diffractive security elements commonly referred to as 'holograms', with the invention being of relevance to the fields of security labelling, security printing. The invention is concerned particularly, but not exclusively, with digital production of diffractive images, e.g. the digital production of holograms or diffractive security labels and elements.

BACKGROUND OF THE INVENTION

Holograms are optical elements which are recordings of a pre-existing scene or image. In the recording of a hologram, scattered light from an object is incident onto a recording medium where it interferes with a reference beam such that the interference pattern is recorded in the recording medium (e.g. a photographic plate). The result of recording the image in this manner is that if the recorded interference pattern is then illuminated by the reference beam, the original light field is reconstructed, thus giving the appearance of the presence of the original object. As well as being able to replay holograms by illuminating the rear side with a reference beam, holograms may also be constructed by coating the rear side with a reflective material and then viewing the hologram from the front side.

If the interference pattern is recorded as relief in a photosensitive medium such as a photoresist then it may be reproduced by producing a metal negative copy of this relief and then using that metal negative to emboss the relief into other media such as softened plastics by a hot stamping technique. Typically, such a metal relief would be produced by the method of nickel electroforming.

The technique of hot stamping of diffractive surfaces is often used in the security industry as an anti-counterfeiting measure. This approach is commonly used to demonstrate the authenticity of items such as credit cards or high value branded items such as mobile phone batteries or original manufacturer ink cartridges.

In many cases, the diffractive master may not have been formed as a hologram. However, in all cases the common feature is a structure on the element that is sufficiently small to cause the diffraction of light which is incident upon it.

In the case of hot stamping of nickel formed masters, each diffractive element produced is identical. In some cases, a degree of personalisation or uniqueness is introduced by evaporating the reflective rear layer through a mask so as not to cover the whole of the embossed image. However, this can only produce as many different elements as there are evaporation masks.

It would be highly desirable in the industry to be able to produce such elements digitally so that unique images or personal data could be recorded with the inherent protection of holographic or diffractive structures.

SUMMARY OF THE INVENTION

In one aspect, the invention provides a method of producing a diffractive optical element, comprising forming on a textured surface of a first substrate a predetermined pattern of an ink including an activator for a metallisation reaction and one or more binders; causing or allowing the binder to solidify; applying a first adhesive layer on top of the solidified binder and activator; securing a second substrate to the first adhesive layer; removing the second substrate with adhered solidified binder and activator from the first substrate; and forming a metal coating on the activator-containing regions adhered to the second substrate.

The method results in production of a diffractive optical element comprising a metal coating having the form of the textured surface of the first substrate, adhered to the second substrate.

The first substrate surface forms a "master", with the textured surface conveniently comprising a regular array of closely spaced textured lines, as is required to produce a diffractive texture. The first substrate is conveniently in the form of an electroformed nickel shim having an array of closely spaced parallel raised lines. Alternatively other substrates with textured surfaces may be used, such as an engraved surface or other embossed surface, a holographic relief surface such as a holographic grating or photo-etched material. The substrate is typically in the form of a sheet or layer of material.

The ink is preferably applied on the first substrate surface in patternwise manner to produce the predetermined pattern, typically by a deposition process for example a printing process that may include screen printing and flexo printing. The deposition process is preferably a non-contact process that is preferably digital, e.g. inkjet printing. In this way, any desired pattern of ink can be readily produced.

The ink may alternatively be applied extensively across the first substrate, and the desired predetermined pattern obtained by selective removal of unwanted ink, e.g. by use of a mask for selective curing of binder (as discussed below) only in regions of interest, with remaining uncured ink removed e.g. by washing.

The activator typically comprises a catalyst or catalyst precursor for catalysing a metallisation reaction, and is conveniently a salt or complex of a conductive metal, preferably a salt of a transition metal, particularly palladium, platinum or silver. The salt may be inorganic, such as palladium chloride, or organic, such as palladium acetate or palladium propanoate.

One preferred activator is palladium acetate, which is a catalyst precursor. Palladium acetate is a precursor of palladium, which is a catalyst in metallisation reactions. Palladium acetate may be converted to an active or catalytic form by reduction in situ on the substrate to form palladium metal. The resulting palladium metal can catalyse deposition of metal thereon on appropriate subsequent treatment, to be discussed below.

Alternative activators include other palladium salts, complexes or colloids; salts, complexes or colloids of other transition metals; and metal particles such as particles of bronze, aluminium, gold or copper.

A mixture of activators may be used.

The activator is suitably present in the ink in an amount in the range 1 to 3% by weight of the ink.

The binder functions to produce a form-holding solid carrier for the catalyst on the first substrate surface, taking on the negative form of the textured surface. The binder is caused or allowed to solidify, typically by drying or curing.

The binder typically comprises one or more materials which solidify in use, conveniently by undergoing chemical reaction such as polymerisation and/or cross-linking under appropriate conditions, or by drying. The binder is conveniently curable, with chemical reaction occurring in response to appropriate curing conditions. For example, the binder may be curable in response to a stimulus such as electromagnetic radiation in a particular wavelength range (e.g. ultra-violet, blue, microwaves, infra-red), electron beams or heat. The binder may instead be curable in response to appropriate chemical conditions, particularly the presence of a chemical curing agent or hardener. As a further possibility the binder may be curable in response to the presence of species such as moisture or air. It is convenient to use an ultra-violet curable binder.

The binder thus preferably comprises one or more monomers and/or oligomers which can polymerise and/or cross-link in use. The binder conveniently comprises one or more curable, e.g. UV-curable, acrylates and/or methacrylates. In this case the composition may also include one or more UV photo initiators, with suitable initiators being well known to those skilled in the art.

Further details of suitable curable materials are disclosed in WO2005/056875.

The first adhesive layer may be applied in any convenient manner, including using printing, spraying and spinning techniques such as jet printing, inkjet printing, spin coating, spray coating, aerosol spraying, roller coating, curtain coating, screen printing, litho printing, flexo printing, gravure printing and pad printing, or by any other liquid application technique.

The first adhesive typically comprises one or more curable materials, e.g. generally as discussed above in connection with the binder, and conveniently comprises one or more monomers and/or oligomers which can polymerise and/or cross-link in use. The first adhesive conveniently comprises one or more curable, e.g. UV-curable or thermally-curable, acrylates and/or methacrylates, with one or more UV photo initiators being included if appropriate.

The second substrate (which ultimately forms a backing or support of the diffractive optical element) may be of any desired suitable material, and may be selected having regard to the intended use of the element. The second substrate is typically a sheet or layer of plastics material (transparent, translucent or opaque), paper, card etc, but other materials may be used.

Where the second substrate is transparent or translucent, the adhesive may be cured, if appropriate, by exposure to ultra violet or other optical radiation after application of the substrate. Alternative, the adhesive may be thermally cured by exposure to heat after application of the second substrate, or the adhesive may be allowed to remain tacky provided the adhesion of the adhesive to the second substrate is greater than the adhesion of the solidified binder and activator to the first substrate.

The second substrate with adhered solidified binder and activator can be simply peeled away from the first substrate, producing a textured structure (complementary to the textured surface of the first substrate), carrying the deposited pattern of activator (with interposed adhesive) supported on the second substrate.

The metal coating is typically formed by the reduction of metal ions in a reaction involving the activator, a metal ion and a reducing agent. A variety of different techniques may be used, including electroless deposition and the process disclosed in WO 2004/068389. The activator is carried on the second substrate as described above, and other necessary reagents may be deposited (by inkjet printing, immersion or otherwise) in one or more further liquids, resulting in reaction to a metal layer on the second substrate. Further details of suitable techniques are given in WO 2004/068389, WO 2005/045095, WO 2005/056875 and WO 2005/010108. Electroless deposition is preferred.

The metal ion may be an ion of any conductive metal, particularly a transition group metal. Preferable conductive metals include copper, nickel, silver, gold, cobalt, a platinum group metal, or an alloy of two or more of these materials. The metal may include non-metallic elements, for example, the conductive metal may be nickel-phosphorus alloy.

The metal ion is typically in the form of a salt, for example copper sulfate. The metal ion might instead be present in a complex such as with EDTA (ethylenediaminetetraacetic acid) or cyanide.

Examples of appropriate reducing agents are formaldehyde, most other aldehydes, glucose, sodium hypophosphites, glyoxylic acid and DMAB (dimethylamine borane).

In one preferred embodiment, the second substrate is exposed to DMAB and then immersed in a bath containing a copper plating solution (e.g. Enplate 827 solutions A, B and C from Cookson Electronic Materials) (Enplate is a Trade Mark) under suitable conditions to form conductive copper regions on the deposited palladium (e.g. 1 minute at 45° C.). Exposure to DMAB is optional.

The metallisation process results in a metal coating forming selectively on only activator-bearing regions of the second substrate, thus having the predetermined pattern. This metal coating retains the form of the original textured master, and its reflectively enhances the appearance of the resulting diffractive optical element.

A second adhesive layer may optionally be applied to the metal-bearing surface of the second substrate. The second adhesive layer functions to protect the metal from oxidation. The second adhesive may be applied by techniques as described above in connection with the first adhesive. The second adhesive may comprise one or more curable materials, e.g. as discussed above in connection with the first adhesive, and may be the same as or different to the first adhesive. Where the first and second adhesives are the same, or have the same refractive index, this has the effect of removing refractive index contrast between the two adhesive layers, thus confining the diffractive effect solely to the metallised areas.

As a further possibility, a layer of a third substrate material, which is typically translucent or transparent, is optionally applied on top of the metal coating (either directly onto the metal coating or onto a second adhesive layer over the metal coating). The third substrate and second substrate may be bonded together, e.g. by application of heat and pressure, to produce a laminated structure encasing the diffractive optical element. If the third substrate material has a similar refractive index to the adhesive then it will remove any diffractive effect in the adhesive region such that the diffractive effect is localised solely to the metallised area. Alternatively, if a third substrate material of strongly differing refractive index to that of the adhesive is used then it may serve to preserve the diffractive properties of the textured adhesive region.

In preferred embodiments, using digital methods for application of the ink, e.g. inkjet printing, the invention enables ready production of unique, customised elements and provides the ability to record unique, e.g. personal, information in combination with the diffractive appearance.

The invention also includes within its scope a diffractive optical element produced by the method of the invention, particularly diffractive security elements and holograms.

Embodiments of the invention will be further described, by way of illustration, with reference to the following drawings, in which FIGS. 1 to 8 illustrate schematically the method of the invention.

BRIEF DESCRIPTION OF THE SEVERAL VIEWS OF THE DRAWINGS

Referring to the drawings, FIG. 1 shows in schematic side view a first substrate 1 comprising an electroformed nickel shim in the form of a planar layer having textured surface relief 2 on one surface thereof comprising a regular array of closely spaced parallel raised lines, constituting a negative "master". A UV-curable catalytic ink comprising binder and catalyst (activator) is applied patternwise to selected regions of the textured surface 2, forming ink layers 3 (FIG. 2). The ink is cured by exposure to UV. A clear UV-curable adhesive (the first adhesive) is applied over the ink layers 3 and the nickel master, forming an adhesive layer 4 as shown in FIG. 3. A sheet 5 of transparent second substrate material is then laminated over the UV-curable adhesive and the adhesive is then cured by exposure to UV through the second substrate material (FIG. 4).

Figure 1:
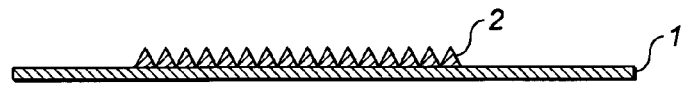
FIG. 1 is a schematic side view of a first substrate for use in the method of the invention.
Figure 2:
FIG. 2 is similar to FIG. 1, including an ink layer on the substrate.
Figure 3:
FIG. 3 is a view similar to FIGS. 1 and 2, including an adhesive layer.
Figure 4:
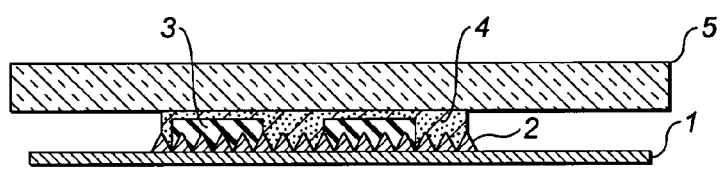
FIG. 4 is a view similar to FIGS. 1 to 3, including a second substrate.
Figure 5:
FIG. 5 is a schematic side view of the second substrate with adhesive and ink layers of FIG. 4.
Figure 6:
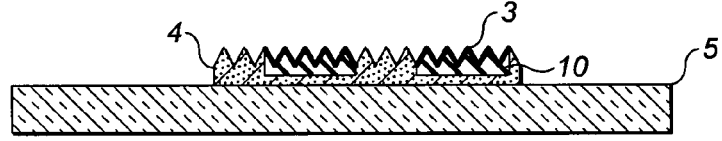
FIG. 6 is a view similar to FIG. 5, including a copper layer.

The structure consisting of the second substrate 5, adhesive layer 4 and catalytic ink layers 3 is then peeled away from the nickel master first substrate in order to provide a free-standing structure with exposed surface relief opposite to that of the nickel master, as shown in FIG. 5. The free-standing structure is then immersed into an electroless copper plating bath and a thin layer of copper metal 10 is deposited only on the exposed surfaces of the catalytic ink, as shown in FIG. 6, forming a diffractive optical element. The metal layer enhances the reflectivity of the embossed texture and intensifies the appearance of the resulting diffractive optical element in the metallised regions.

Figure 7:
FIG. 7 is a view similar to FIG. 6 including a layer of second adhesive.

In one variant embodiment (embodiment 2), the diffractive optical element of FIG. 6 is optionally coated with a layer 11 of UV-curable adhesive (the second adhesive), as shown in FIG. 7. This layer is then cured, protecting the exposed metal from oxidation. If the first and second adhesives are the same, or have the same refractive index, this variant additionally has the effect of removing refractive index contrast between the textured adhesive layer 4 and the second adhesive layer 11 thus confining the diffractive effect solely to the metallised areas.

In a second variant embodiment (embodiment 3) (not shown), the diffractive optical element of FIG. 6 is optionally coated with another layer of UV-curable adhesive, as in embodiment 2, to which is then applied a further sheet of transparent substrate material (third substrate), through which the adhesive is cured by exposure to UV. Thus embodiment can have the same index matching effect as embodiment 2 but also results in bonding the diffractive element into a laminated structure.

Figure 8:
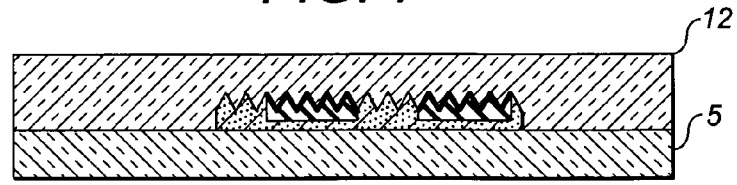
FIG. 8 is a view similar to FIG. 6, including a third substrate.

In a third variant embodiment (embodiment 4), illustrated in FIG. 8, the diffractive optical element of FIG. 6 is optionally laminated against a further sheet 12 of substrate material (third substrate), that is typically transparent, e.g. of the same material as sheet 5, and the whole stack is hot-pressed together such that the substrate materials rise above their glass transition temperatures and bond together, to produce the structure shown in FIG. 8. This method also produces a completely laminated structure but without the second adhesive layer of embodiment 3. In situations where the first adhesive is chosen to have a refractive index the same as or close to that of the substrate material, the diffractive effect will only be visible in the metallised areas. In situations where the refractive index of the adhesive was chosen to be higher or lower than that of the substrate material, a diffractive effect will still be visible in both the metallised and transparent areas.

The laminated structures of embodiment 3 and embodiment 4 (FIG. 8) may each optionally be further laminated into a greater stack, e.g. including a layer with text or imagery which is visible through the non-metallised diffractive regions.

As a further possibility, in the laminated structures of embodiment 3 or embodiment 4 (FIG. 8) the metallised regions 10 may be patterned to provide text or imagery (such as a photograph of a person) which is visible in the final laminated item.

EXAMPLE 1

A catalytic ink formulation e.g. as disclosed in WO2005/056875 or WO2006/123144, was inkjet printed patternwise onto an electroformed nickel shim, bearing the texture of a diffractive element and subsequently cured with UV light. A layer of UV-curable adhesive (as described below) was then deposited over the entire surface. A thin sheet of polyethylene terephthalate (PET) foil (50 µm thick PMX 726, from HiFi Films) was then laminated over the wet adhesive. The adhesive was then cured through the clear PET film using UV light once again (e.g. light from a Fusion systems Light Hammer 6—Light Hammer is a Trade Mark).

The PET film was then peeled away from the nickel shim, taking with it the cured adhesive and catalytic ink. The whole structure was then exposed to DMAB and then plated with copper in Enplate 872 solutions A, B and C as described in WO2005/056875 and WO2008/012512. Plating was performed only until a continuous layer of reflective copper was visible on the catalytic ink regions (30 s to 1 min).

After removal from the plating solution and drying a diffractive effect was visible across all of the areas that had previously been formed on the textured area of the nickel shim, the intensity of the diffractive appearance being somewhat stronger over the metallised regions than over the regions of textured UV adhesive.

In a subsequent stage, a second layer of the UV adhesive was deposited over the whole structure and cured. This has the effect of matching the refractive index of the first layer of adhesive and therefore removing any diffractive effect from the non-metalized regions, thus giving the appearance of isolated metallised holograms within a clear matrix.

Adhesive Formulation (% by weight)

| | | |
|---|---|---|
| DPGDA | 49.3% | Dipropylene glycol diacrylate e.g. SR508 |
| HDDA | 33.8% | 1,6-hexanediol diacrylate e.g. Actilane 425 |
| CN 2505 | 7.0% | Polyester tetraacrylate |
| DPHA | 3.9% | Dipentaerythritol hexaacrylate e.g. Actilane 450 |
| Irgacure 127 | 1.7% | UV photoinitiator |
| Irgacure 819 | 4.3% | UV photoinitiator |

(First 3 from Sartomer, DPHA from Cyex Surface Specialities, last two from Ciba Speciality Chemicals.) (Actilane and Irgacure are Trade Marks.)

EXAMPLE 2

Electroformed nickel shim is used in the manufacture of holographic labels. A section 300 mm×200 mm bearing the texture of a diffractive element was used as the base layer for the exposure.

An ink of the following composition was used to inkjet print a pattern onto the shim.

| | Wt. % | |
|---|---|---|
| SR339C | 19.83 | 2-phenoxyethyl acrylate |
| DPGDA | 26.72 | |
| CN2505 | 9.00 | Polyester Tetraacrylate |
| DPHA | 2.50 | Dipentaerythritol hexaacrylate |
| Irgacure 819 | 1.30 | UV photoinitiator |
| Irgacure 127 | 3.30 | UV photoinitiator |
| Novec FC4430 | 0.30 | Fluorosurfactant |
| Ethyl lactate | 29.17 | |
| Palladium acetate | 2.92 | |
| Quadrol | 4.96 | N,N,N',N'-Tetrakis (2-hydroxypropyl) ethylene-diamine |

SR339C UV-curable monomer was supplied from Sartomer. DPGDA is dipropylene glycol diacrylate from Sartomer. CN2505 is polyester tetraacrylate from Sartomer. DPHA is dipentaerythritol hexaacrylate from Cyex Surface Specialities. Irgacure products were sourced from Ciba Speciality Chemicals. Novec FC4430 is a non-ionic polymeric fluorochemical surfactant from 3M. Quadrol is a polyol from BASF. (Irgacure, Novec and Quadrol are Trade Marks.)

The inkjet printer used was a modified DMP-2831 inkjet print system from Dimatix. A 10 pl drop was used, printed with a drop pitch of 20 micron. This produced an ink thickness of approximately 9 micron. The ink was cured using Omnicure S2000, at 100% power, with 8 mm light guide attached to the printhead (Omnicure is a Trade Mark). The design of the printer is such that the UV source was passed 25 times over each ink region.

A layer of adhesive of the composition given below was then deposited by flood coating the ink regions with liquid ink. A thin sheet of polyethylene terephthalate (PET) foil (50 um thick PMX 726, from HiFi Films) was then placed over the wet adhesive layer, and the surplus pressed out. Experiment has demonstrated that the exact thickness of the adhesive layer is not critical. The adhesive was then cured through the clear PET film using UV light from a cold-cure UV lamp from DPL Industri at 20% set power. A single pass beneath the lamp at 0.3 m/s was sufficient to cure the adhesive layer.

The composition of the adhesive is given below.

| | Wt. % |
|---|---|
| DPGDA | 44.15 |
| HDDA | 44.15 |
| DPHA | 6 |
| Irgacure 819 | 1.6 |
| Irgacure 127 | 4.1 |

HDDA is 1,6-hexanediol diacrylate from Sartomer. Other chemicals were sourced as above.

The PET film was then peeled away from the nickel shim, taking with it the cured adhesive and ink layer. The film was then exposed to a pre-dip consisting of 1.6% DMAB at 21 degrees C for 2 minutes to activate the catalyst. Copper plating was carried out using Enplate 872 solution for 3 minutes at 45 degrees C. This was sufficient to deposit a coating of approximately 50 nm of copper.

After removal from the plating solution and drying, a diffractive effect was visible across all of the areas that had previously been formed on the textured area of the nickel shim, the intensity of the diffractive appearance being stronger over the metallised regions than over the regions of textured UV adhesive.

In a subsequent stage, a second layer of the UV adhesive was deposited over the whole structure and cured. Since this matched the refractive index of the first adhesive layer it removed the diffractive effect from the non-metallised regions. This gave the appearance of isolated metallised holograms within a clear matrix.

The invention claimed is:

1. A method of producing a diffractive optical element, comprising forming on a textured surface of a first substrate a predetermined pattern of an ink including an activator for a metallisation reaction and one or more binders; causing or allowing the binder to solidify;
   applying a first adhesive layer on top of the solidified binder and activator;
   securing a second substrate to the first adhesive layer;
   removing the second substrate with adhered solidified binder and activator from the first substrate; and
   forming a metal coating on the activator-containing regions adhered to the second substrate.

2. A method according to claim 1, wherein the first substrate comprises an electroformed nickel shim having an array of closely spaced parallel raised lines.

3. A method according to claim 1, wherein the ink is applied on the textured surface of the first substrate in patternwise manner to produce the predetermined pattern.

4. A method according to claim 1, wherein the ink is applied by a noncontact process.

5. A method according to claim 1, wherein the ink is applied by inkjet printing.

6. A method according to claim 1, wherein the activator comprises a catalyst or catalyst precursor for catalysing a metallisation reaction.

7. A method according to claim 1, wherein the binder is curable.

8. A method according to claim 7, wherein the binder comprises one or more monomers or oligomers which can polymerise or cross-link in use.

9. A method according to claim 8, wherein the binder comprises one or more UV-curable acrylates or methacrylates.

10. A method according to claim 1, wherein the first adhesive comprises one or more curable materials.

11. A method according to claim 10, wherein the first adhesive comprises one or more UV-curable or thermally-curable acrylates or methacrylates.

12. A method according to claim 1, wherein the metal coating is formed by electroless deposition.

13. A method according to claim 1, additionally comprising applying a second adhesive layer to the metal-bearing surface of the second substrate.

14. A method according to claim 1, further comprising securing a layer of transparent third substrate material on top of the metal coating.

15. A diffractive optical element produced by the method of claim 1.

* * * * *